United States Patent [19]

Melgeorge

[11] 4,127,107
[45] Nov. 28, 1978

[54] AUXILIARY HEATING DEVICE FOR STANDARD HOT WATER TYPE HOME HEATING SYSTEMS

[76] Inventor: Edward L. Melgeorge, Star Rte. Box 234, Babbitt, Minn. 55706

[21] Appl. No.: 741,943

[22] Filed: Nov. 15, 1976

[51] Int. Cl.² ............................................. F24H 1/18
[52] U.S. Cl. ................................. 126/361; 126/362; 126/351; 237/8 R
[58] Field of Search .............. 126/351, 374, 132, 133, 126/34, 60; 237/8 A, 8 R; 236/14, 16, 9 A; 122/135

[56] References Cited

U.S. PATENT DOCUMENTS

| | | | |
|---|---|---|---|
| 897,609 | 9/1908 | Fairchild | 122/213 |
| 1,122,989 | 12/1914 | Newkvmet | 219/279 |
| 1,174,525 | 3/1916 | Schleit | 236/16 |
| 1,383,530 | 7/1921 | Cotton | 126/347 |
| 1,958,815 | 5/1934 | Cox | 236/16 |
| 2,070,536 | 2/1937 | Hoffman | 126/285 |
| 2,084,990 | 6/1937 | Burghardt et al. | 122/135 |
| 2,102,873 | 12/1937 | Anderson | 236/16 |
| 2,310,364 | 2/1943 | Haines et al. | 236/16 |

Primary Examiner—John J. Camby
Assistant Examiner—Larry I. Schwartz
Attorney, Agent, or Firm—Merchant, Gould, Smith, Edell, Welter & Schmidt Professional Association

[57] ABSTRACT

An auxiliary heating device for supplementing the performance of a standard hot water type home heating system with the heat produced by combusting a low cost, readily available fuel is disclosed. The device comprises a cylindrical fire chamber substantially closed at both ends and an elongated annular water chamber closed at both ends surrounding at least a portion of the fire chamber in a noncoaxial relationship thereto. Means are provided for plumbing the water chamber into the main heating system, whereby cool water enters the water chamber and heated water is pumped by the main system's pump to radiators disposed around the home. A combustion air passageway is provided for passing air to the combustion chamber. Means for varying the size of the passageway in response to the temperature of water in the water chamber are also provided so as to control the combustion rate of the fuel. Means for supplying fuel to the combustion chamber are further provided.

8 Claims, 6 Drawing Figures

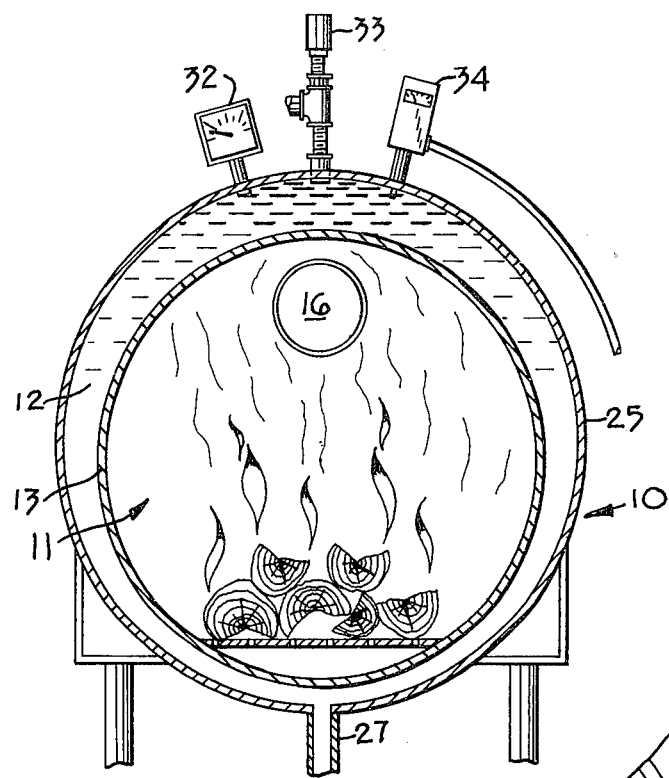
FIG. 3
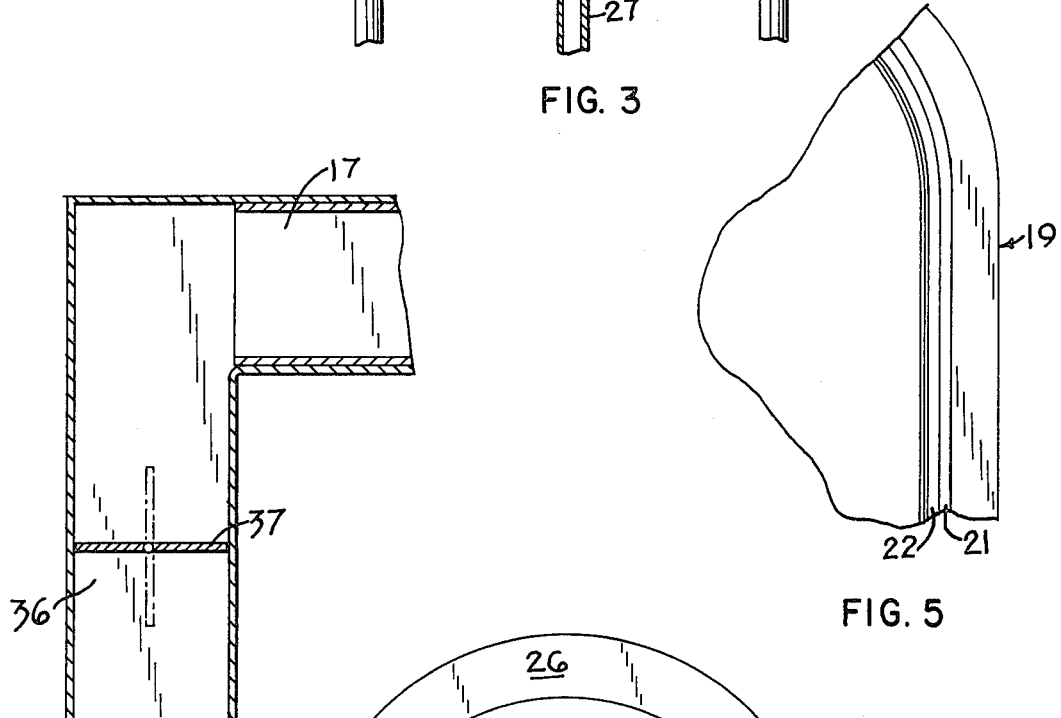
FIG. 4
FIG. 5
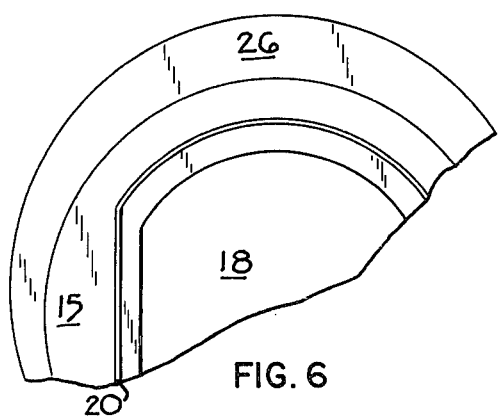
FIG. 6

AUXILIARY HEATING DEVICE FOR STANDARD HOT WATER TYPE HOME HEATING SYSTEMS

BACKGROUND OF THE INVENTION

1. Field of the Invention

This invention relates to the field of furnaces. More particularly, this invention relates to the field of auxiliary heating devices for supplementing the performance of furnaces in home heating systems of the hot water type.

2. Description of the Prior Art

Typically, a home heating system of the hot water type includes a heat source, a water circulation system for passing cool water near the heat source, conducting the heated water to remote radiators, and returning the water to the heat source for reheating, a water temperature sensing device for controlling the rate of combustion in the heat source, and a thermostat for controlling the rate of circulation throughout the system. Generally, the heat source is a furnace which burns a high grade fuel such as natural gas, oil, or high grade coal. Such fuels are characterized by their steady, easily adjustable rate of combustion. Such fuels are also characterized by their relatively high cost, which is steadily increasing.

It has therefore become desirable to find ways of utilizing lower grade, less expensive fuels to heat homes — not only to save costs to the home owner, but also to conserve our supplies of precious, fossil fuels.

Efforts to utilize such low grade fuels in conjunction with already existing heating plants have not proved altogether satisfactory. For instance, U.S. Pat. No. 2,480,883 to Schramm discloses two complete furnace systems in a complex linkage with one another, one system burning a higher grade fuel than the other. Such a system requires two complete sets of pumps, water temperature sensing means, relay systems, etc. and has to be installed as a unit at the time of original construction of the dwelling, or else requires a major remodeling job to install in an existing structure. The patent of Cleer, Jr., U.S. Pat. No. 3,958,755, discloses a simpler system which utilizes a conventional wood burning fireplace-type structure having a water chamber surrounding an open fireplace, so as to use the heat from the fire to heat water circulated through the existing heating system. Cleer, Jr., however, does not provide any means for controlling the rate of combustion of wood in his fireplace, short of tending the fire manually, a time consuming job in itself.

SUMMARY OF THE INVENTION

Consequently, it is a feature of the present invention that an auxiliary heating device is provided which burns a low grade, relatively inexpensive fuel such as wood, and which can be used to augment performance of a previously installed home heating plant of the hot water type.

It is another feature of this invention that a heating device is provided which incorporates features for controlling the rate of combustion of the fuel burned with a minimum of manual tending required.

It is a further feature of this invention that such a heating device is provided which is of relatively simple, and inexpensive structure, and which can be easily hooked into the permanent heating plant of the dwelling with a minimum amount of time, labor, and structural changes.

It is still a further feature of the present invention that an auxiliary heating device is provided which is characterized by a highly efficient heat transfer between the fire chamber and the water chamber.

The above enumerated features are accomplished in the present invention by providing a generally horizontally disposed, cylindrically shaped, auxiliary heating unit comprising an inner, cylindrical combustion chamber which is closed at both ends, except for a door at the front which can be opened to stoke the fire, a chamber, and a draft stack, or opening, which provides a means for combustion air to reach the chamber. The unit also comprises a water chamber, being cylindrical, or annular, and closed at both ends, which surrounds the fire chamber. The water chamber is provided with water inlet means for easily connecting the water chamber with the cool water carrying pipes of the primary system, and water outlet means for connecting the water chamber with the hot water circulating means of the primary system. Thus, only a simple plumbing connection is required to install the auxiliary unit.

The draft stack of the unit is fitted with a means for regulating the amount of air which may pass therethrough, such as a carburetor with a butterfly valve therein. The regulating means, in turn, is adjusted by an electric motor which is controlled by a sensing device which is responsive to temperature changes in the water chamber. Thus, for example, the regulating means may be adjusted to be in a normally "closed" position, allowing only enough air into the fire chamber to maintain some combustion of the fuel; when the temperature of water in the water chamber falls below a predetermined level, the sensing means will activate the motor, which, in turn, adjusts the regulator to an open position, allowing a maximum amount of air to enter the fire chamber, and thus increasing the fuel combustion rate, and water temperature. In like manner, the sensing means will activate the motor to return the regulator means to its normally closed position when a predetermined water temperature has been reached. It can thus be seen that the only manual tending required of the device is the occasional stoking of the fire chamber with fuel — an operation that need only be carried out twice or three times a day if the fuel used is wood. The closed chamber with automatically adjustable draft provides for a steady and controllable combustion rate of the fuel, which is not found in an open fireplace.

In order to insure that the heat transfer between the fire chamber and the water chamber is efficient, the two parallel cylinders which are those chambers are offset, rather than coaxial, so that a greater portion of the volume of the water chamber is disposed above the fire chamber than is disposed below the fire chamber. It will be appreciated that if a fire is burning in the bottom of the fire chamber, the zone of maximum heat transfer between the fire chamber and the water chamber will be at the top of the combustion chamber above the flame, rather than at the bottom of the chamber beneath the fuel. Consequently, it is desirous that a greater volume of water be disposed above the combustion zone than below that zone. The above-mentioned offset of the chambers accomplishes this result and thus satisfies the object of an efficient heat transfer, actually approximating a uniform rate of heat transfer between the fire chamber and the water chamber.

In use, the apparatus of the present invention is plumbed to the existing circulation system of the primary heating plant of the home and the water chamber is filled with cool water. Logs are placed in the combustion chamber and the combustion chamber door is closed after a fire is started. The water temperature sensing device of the auxiliary unit is set at a predetermined setting, and the water temperature sensing device of the primary unit is set at a predetermined temperature which is lower than that of the auxiliary unit. When the water in the auxiliary water chamber is below its temperature setting, the motor controlling the draft passage size regulator is actuated to open the regulator, so that the combustion rate within the chamber is increased; once the water temperature reaches the set temperature, the draft regulator will be automatically closed by the motor. If the water temperature should fall to the water temperature setting of the primary unit, for instance if the fire should go out in the auxiliary device or the fuel be totally consumed, the burners of the primary system will kick in to heat water in the circulation system. Due to the efficient design of the auxiliary heating device, all that need be done to maintain the desired water temperature is to stoke the chamber with logs several times a day. By doing this, the primary furnace burners will not kick in, and enormous savings in fuel bills and high grade fuel consumption can be realized.

BRIEF DESCRIPTION OF THE DRAWINGS

FIG. 3 is an enlarged sectional view taken along the line 3—3 of FIG. 1.

FIG. 4 is an enlarged sectional view taken along the line 4—4 of FIG. 2.

FIG. 5 is a side elevation of the backside of the door of the present invention, with portions thereof broken away.

FIG. 6 is a side elevation of the door jam of the present invention, with portions thereof broken away.

DESCRIPTION OF THE PREFERRED EMBODIMENT

Figure 1:
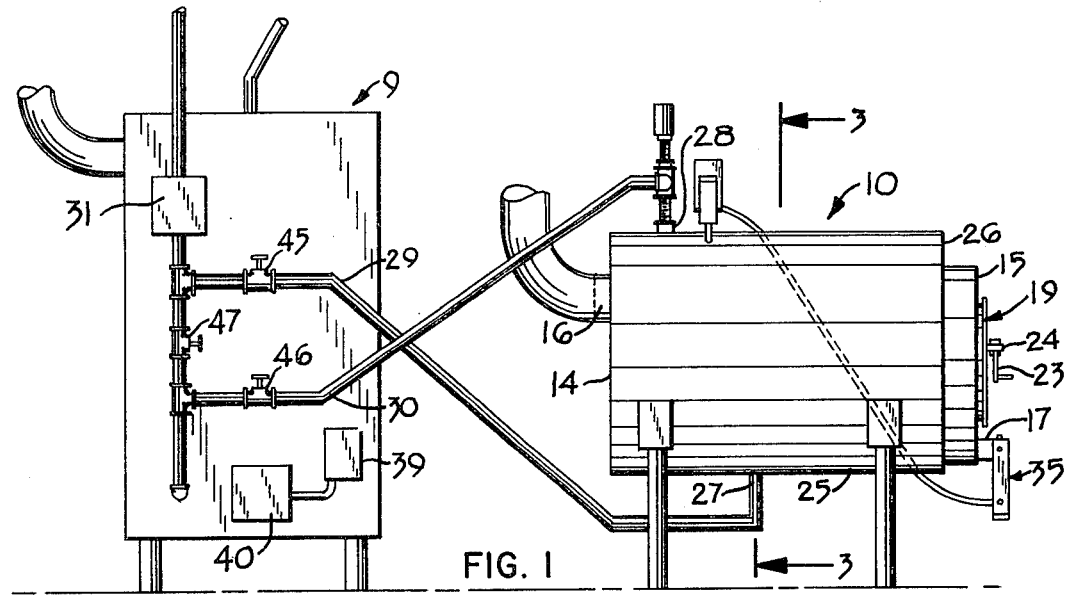
FIG. 1 is a side elevation of the present invention plumbed into a conventional hot water type home heating system.

Referring now to FIG. 1, an auxiliary heating device 10 is shown hooked up to an existing home heating system of the hot water type, generally designated by the number 9.

Figure 2:
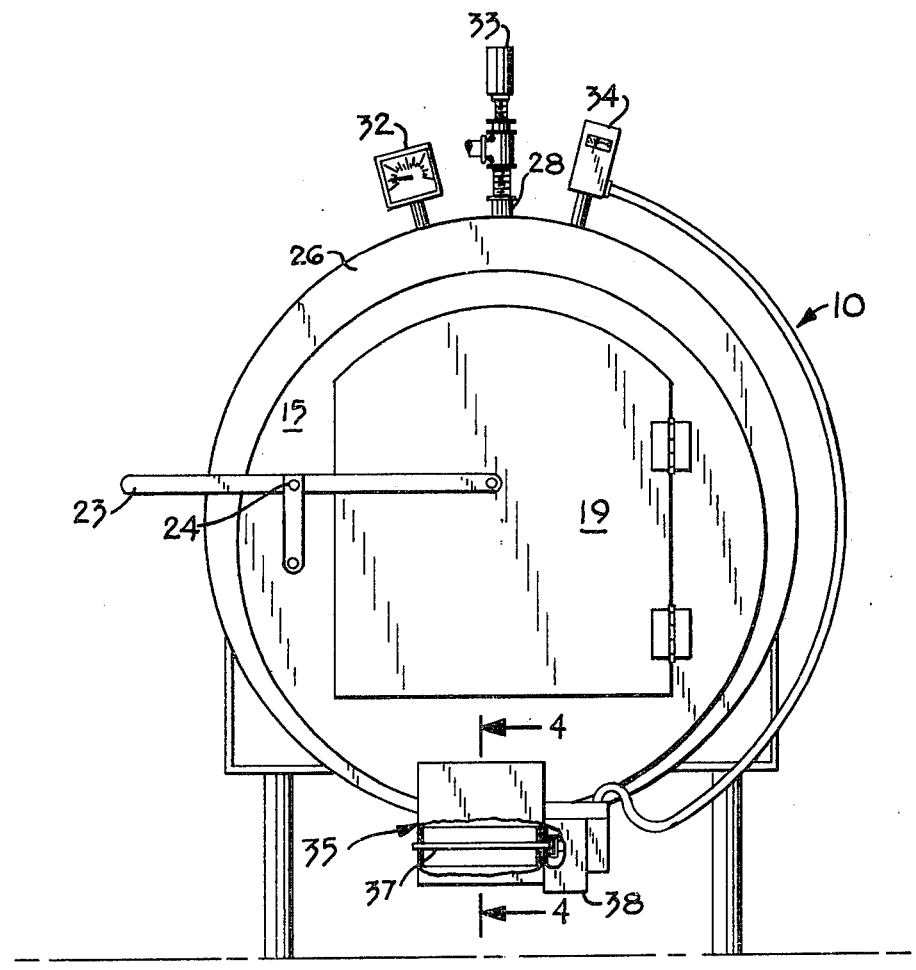
FIG. 2 is a front elevation of the present invention.

Auxiliary device 10, as more clearly shown in FIGS. 2 and 3, comprises a fire chamber 11, a portion of which is surrounded by a water chamber 12. Fire chamber 11 is a horizontally disposed, substantially closed cylinder, having a peripheral cylindrical wall 13, a rear wall 14, and a front wall 15. Fire chamber 11 is provided with a chimney stack 16 through wall 14 to allow exhaust from the chamber, a draft passage or stack 17 extending through wall 15 to provide combustion air to the chamber, and a door opening 18 in wall 15 to provide a means of depositing fuel in chamber 11.

A hinged cast-iron door 19 is adapted to seal opening 18 when device 10 is in use. An air-tight seal is insured by means of a flange 20 which extends around the periphery of opening 18, outwardly from wall 15. A groove 21 in door 19 accepts flange 20 when door 19 is closed. Groove 21 is lined with a fireproof sealant, such as asbestos rope, indicated by the numeral 22 in FIG. 5. Handle means 23, disposed on door 19 cooperate with pin 24 on wall 15 to lock door 19 shut when device 10 is in use.

Water chamber 12 is a substantially closed, cylindrical, or annular, chamber disposed about a portion of fire chamber 11 and the inner boundary of water chamber 12, being shared in common by both chambers. Chamber 12 further has an outer cylindrical wall 25 and an annular front wall 26; chamber 12 is sealed at the rear by a continuation of rear wall 14.

As is indicated in FIGS. 1 and 3, chambers 11 and 12 are generally parallel to each other and horizontally disposed. The chambers are non-coaxially aligned, however, the greater portion of the volume of chamber 12 being disposed above chamber 11 than below it. Water chamber 12 is fitted with a cold water inlet 27 and a hot water outlet 28. As is shown in FIG. 1, inlet 27 is plumbed to the cool water line 29 of the home heating plant; and outlet 28 is plumbed to the line 30 through which heated water is pumped by pump 31 throughout the home to remote radiators. Water chamber 12 is further fitted with a pressure temperature gauge 32, a pressure relief valve 33, and a water temperature sensing device 34. In the preferred embodiment, device 33 is a Minneapolis Honeywell "AQUASTAT".

A carburetor 35 is mounted on draft stack 17 to regulate the flow of combustion air into chamber 11, and thus the rate of combustion within chamber 11. As shown in FIGS. 2 and 6, carburetor 35 comprises an air passageway 36 with a rotatable butterfly valve 37 mounted therein. All of the combustion air entering chamber 11 must pass through carburetor passageway 36 and draft stack 17. Butterfly 37 is normally in a "closed" position, shown in FIG. 4, in which a small amount of air passes through draft stack 17 to keep fuel in chamber 11 burning at a slow rate. Valve 37 also has an open position shown in FIG. 2 and indicated by dotted lines in FIG. 4, in which a maximum amount of air is allowed to enter chamber 11 in order to provide for a maximum rate of combustion.

Means are provided for automatically rotating valve 37 between its closed and open position. The means comprises an electric motor 38 such as a "WHITE ROGERS" 25 volt zone control motor, engaging valve 37, and the beforementioned "AQUASTAT" 34, which senses changes in the water temperature within chamber 12 and actuates motor 38 to either open or close valve 37. Means are also provided for manually rotating butterfly valve 37 in the event of a power outage.

In operation, heating device 10 is plumbed into the existing home heating system 9 in series, so that cool water can enter chamber 12 through inlet 27, and heated water can be pumped out of chamber 12 through outlet 28 to remote heat radiators disposed about the home when device 10 is "cut in" to existing system 9. The cut in is accomplished by opening valves 45 and 46, and closing valve 47. Wood is stoked into fire chamber 11, combustion is initiated, and door 19 is closed. The temperature to which it is desired to heat the water in chamber 12 is set on AQUASTAT 34. If the temperature of water in chamber 12 is below the predetermined temperature setting, AQUASTAT 34 actuates motor 38 to move carburetor valve 37 to the open position, thus allowing more air to chamber 11 and a higher rate of combustion therein. When the water temperature in chamber 12 reaches the predetermined temperature, AQUASTAT 34 actuates motor 38 to return valve 37 to its closed position. The substantially closed nature of chamber 11, in combination with the recited temperature sensitive carburetor controls produces a controlled rate of fuel combustion which is regulated with a minimal amount of manual tending. All that is required is that fire chamber 11 be stoked with wood occasionally.

Should the fuel be totally consumed, or the flame go out for any other reason, the main furnace burners 40 will kick in if the main system water temperature sensor, indicated by the numeral 39, is set five to ten degrees below the predetermined setting of AQUASTAT 34. In such a situation, the chain of events would proceed as follows: The fire in chamber 11 goes out; water temperature in chamber 12 drops; AQUASTAT 34 actuates motor 38 and valve 37 is opened; there is no combustion in chamber 11, so water temperature continues to drop; the temperature drops below setting of sensor 39, the main system burners are activated by sensor 39 to heat water in the main system to an adequate temperature.

From the foregoing, it will be seen that an easily installable, wood burning heating device which maintains a predetermined water temperature and automatically regulates its rate of fuel combustion, and which provides a reliable auxiliary heating unit for an existing home heating unit of the hot water type, has been realized in the present invention.

What is claimed is:

1. An auxiliary heating device for use in combination with a primary heating system of the hot water type including a furnace, a water circulation system, first means for sensing when the water temperature in said water circulation system reaches a first predetermined temperature, and means connected to said first water temperature sensing means for increasing the rate of combustion in the furnace when the water temperature in the water circulation system falls below said first predetermined temperature, said auxiliary device being adapted to burn a lower grade of fuel than the furnace of the primary system and comprising:
    (a) a substantially closed combustion chamber having a passageway for providing combustion air to the chamber and a chimney stack for exhausting combustion products therefrom;
    (b) a substantially closed water chamber disposed about at least a portion of the combustion chamber;
    (c) means for connecting the water chamber with the circulation system of the primary heating system;
    (d) second means in fluid communication with said water chamber for sensing when the water temperature in said chamber equals or differs from a second predetermined temperature;
    (e) means connected to said second water temperature sensing means for increasing the rate of fuel combustion in said combustion chamber when the temperature of water in the water chamber falls below said second predetermined temperature, and for decreasing the rate of fuel combustion when the temperature of water in the water chamber reaches or exceeds said second predetermined temperature;
    (f) wherein said first predetermined temperature is below said second predetermined temperature; and
    (g) means for supplying fuel to the combustion chamber.

2. The heating device of claim 1 wherein said combustion chamber is a generally horizontally disposed cylinder having a front wall, a rear wall, and a horizontal, longitudinal axis, and wherein said water chamber is of an elongated annular shape, having a horizontal, longitudinal axis disposed parallel to said axis of said combustion chamber, said water chamber sharing a common wall with the combustion chamber.

3. The heating device of claim 2 wherein said axis of the water chamber is disposed above said axis of the combustion chamber, so that a greater volume of the water chamber is disposed above the combustion chamber than is disposed below the combustion chamber.

4. The heating device of claim 3 wherein the means for increasing and decreasing the rate of fuel combustion in said combustion chamber comprises:
    (a) a carburetor is communication with the air passageway having adjustable valve means therein rotatable from an opened to a closed position, said valve means regulating the rate of air flow through the passageway;
    (b) an electric motor engaging the valve means for rotating said valve means between the opened and closed positions; wherein said second water temperature sensing means is operable to actuate the motor when the water temperature in the water chamber differs from said second predetermined temperature.

5. The heating device of claim 4 wherein the means for supplying fuel to the combustion chamber is a door in the front wall of the combustion chamber.

6. The heating device of claim 5 wherein the connecting means comprise a cool water inlet into the water chamber and a hot water outlet from the water chamber.

7. An auxiliary, low grade fuel burning heating device for augmenting the performance of a home heating plant of the hot water type, which includes a heat source and means for circulating water past the heat source, to remote heat radiators, and back to the heat source, said auxiliary heating device comprising:
    (a) a substantially closed, horizontally disposed fire chamber having a cylindrical peripheral wall, a front wall, a rear wall, a draft stack to provide combustion air to the interior of the chamber, and a chimney stack to allow exhaust therefrom;
    (b) a substantially closed water chamber annularly disposed about at least a portion of the fire chamber with a greater part of its volume disposed above the fire chamber than below the fire chamber, said water chamber having as one of its walls the cylindrical wall of the fire chamber;
    (c) means for introducing cool water from the home heating plant into the water chamber;
    (d) means for facilitating passage of heated water out of the water chamber to the circulating means of the home heating plant;
    (e) carburetor means for controlling the rate of fuel combustion in the fire chamber mounted on the draft stack, said means comprising a butterfly valve rotatable from a first position allowing a minimum amount of air to pass through the draft stack to a second position allowing a maximum amount of air to pass therethrough;
    (f) means for automatically rotating the butterfly valve in response to temperature changes in the water contained in the water chamber; and
    (g) a door in the front wall of the fire chamber by which means fuel may be deposited in the chamber.

8. The furnace of claim 7 wherein the automatic rotating means comprise:
    (a) an electric motor engaging the butterfly valve; and
    (b) a temperature sensing device in communicating relation with the water chamber operable to actuate the motor when predetermined temperatures have been reached by the water therein.

* * * * *